June 30, 1970 M. A. BUFFINGTON 3,517,661
DIFFERENTIAL PLETHYSMOGRAPHY
Filed April 24, 1967 2 Sheets-Sheet 2
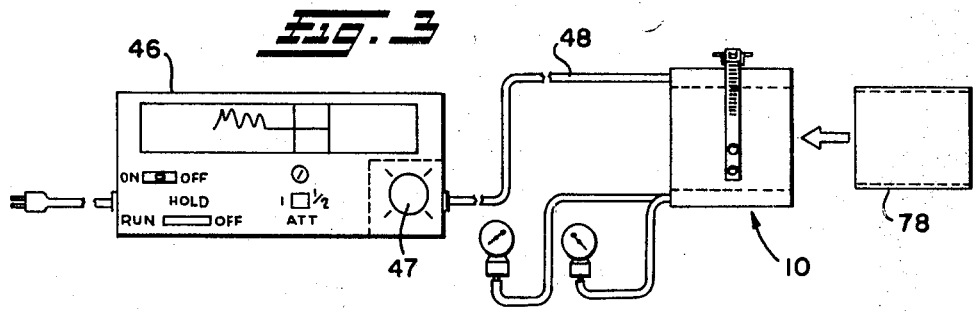
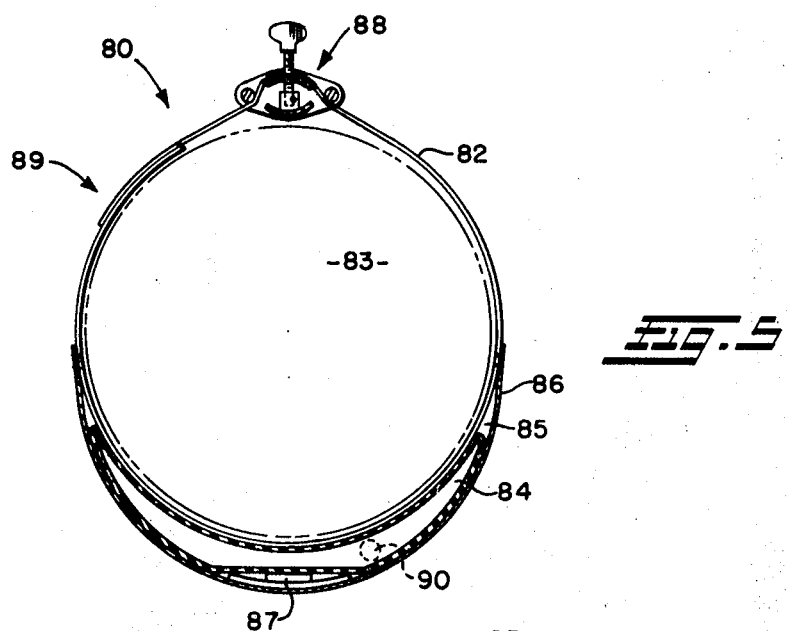
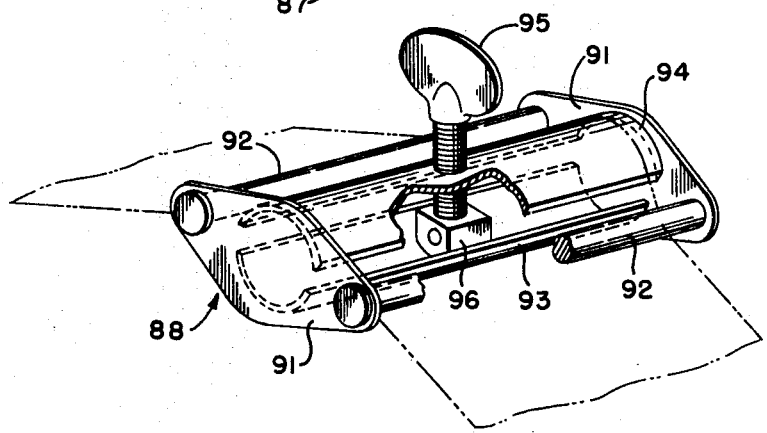
INVENTOR
MARVIN A. BUFFINGTON
BY
Oberlin, Maky, Donnelly & Renner
ATTORNEYS United States Patent Office 3,517,661
Patented June 30, 1970

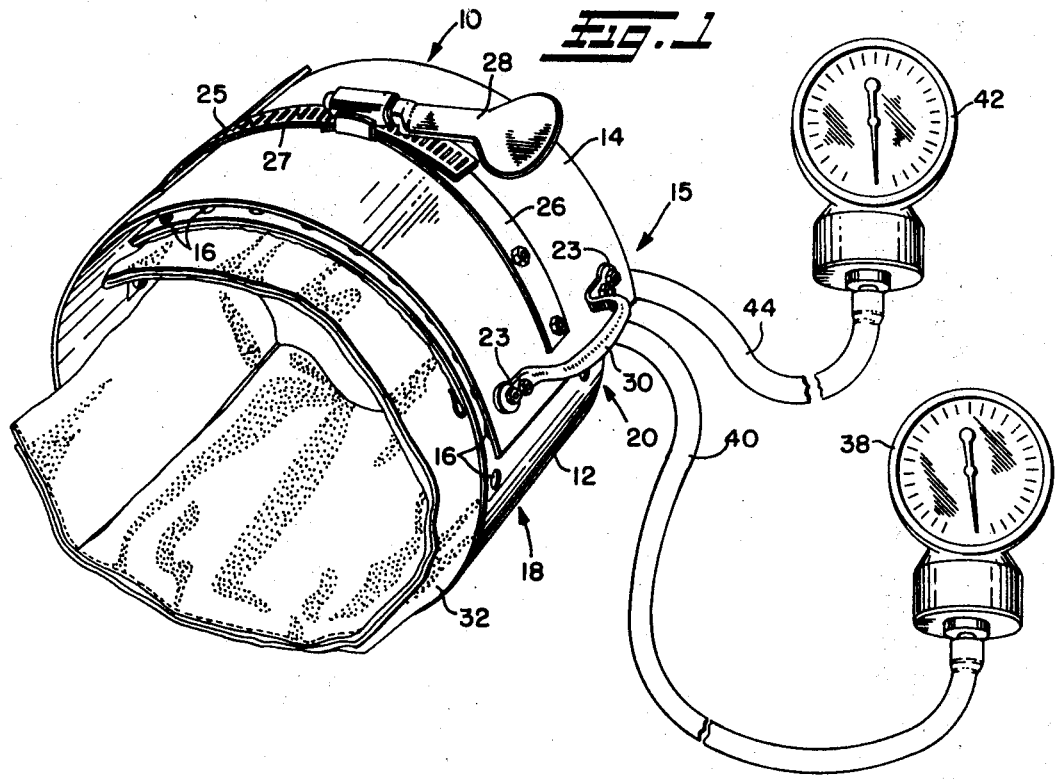

3,517,661
DIFFERENTIAL PLETHYSMOGRAPHY
Marvin A. Buffington, Cleveland, Ohio, assignor, by mesne assignments, to Picker Corporation, White Plains, N.Y., a corporation of New York
Filed Apr. 24, 1967, Ser. No. 633,011
Int. Cl. A61b 5/02
U.S. Cl. 128—2.05
4 Claims

ABSTRACT OF THE DISCLOSURE

Apparatus for measuring blood flow variations including a precisely adjustable cuff for establishing a predetermined air pressure in a bladder partially surrounding the limb of a subject, a transducer for converting the variations transmitted through the bladder to an electrical signal, a monitor for recording the signals, a control for varying the gain of the monitor, and calibrating mechanism for injecting a fixed quantity of air into the bladder to pulse the transducer.

One form of cuff comprises two overlapping sheets with gross adjusting mechanism including dogs on one sheet engaging holes on the other and fine adjusting mechanism including a pair of straps connected to said sheets and drawn together by a continuously adjustable device.

---

This invention relates to a system for recording various parameters of the cardiovascular system of a subject, and more particularly relates to a system for providing an electrical analog of a vascular pulse which may be utilized in a uniform and repeatable manner on a variety of subjects. The apparatus of the invention comprises a unique cuff and air system convention together with a transducer for converting mechanical or acoustic pulsations into an electrical signal for application to a modified pen recorder. The system is unique in that a specified quantity of air is retained within the pneumatic system and provides a basis for correlation of pulse information. Mechanical means are provided for compressing the quantity of air to a desired pressure and are the means for conforming the system to different subjects. Calibration and standardization means are also provided which are significant to the overall technique to maintain accuracy of the system and to test for deficiencies of same from the origin of the signals to the visual recordation of the indications.

This system and apparatus is not to be confused with the typical sphygmomanometric measurement technique wherein the blood vessels are constricted to such an extent that blood flow is completely restricted to provide a systolic indication and then relaxed to ascertain a diastolic indication based upon the absence or presence of auscultatory sounds. Such indications are actually indications of the air pressure within the pneumatic system but through adoption of a standard apparatus and measurement technique have been correlated to reflect the cardiac condition of the subject.

It is an object of this invention to provide a new measurement technique for ascertaining the cardiovascular condition of a subject wherein a plurality of significant parameters may be observed.

It is another object of this invention to provide a cardiovascular measurement technique which is highly accurate and repeatable and compatible among a variety of subjects.

It is a further object of this invention to provide cardiovascular measurement apparatus which simplifies establishment of a predetermined pressure convention and is extremely portable.

It is still another object of this invention to provide a unique calibration apparatus and technique which verifies the accuracy of the system and establishes a reference standard.

It is another object of this invention to provide a means of detecting, transducing and observing or recording what is commonly referred to in the medical and nursing art as the pulse of the patient in a calibrated and therefore repeatable documentable and communicable manner.

Other objects and advantages of the present invention will become apparent as the following description proceeds.

To the accomplishment of the foregoing and related ends the invention, then, comprises the features hereinafter fully described and particularly pointed out in the claims, the following description and the annexed drawings setting forth in detail certain illustrative embodiments of the invention, these being indicative, however, of but several of the various ways in which the principle of the invention may be employed.

In said annexed drawings:

FIG. 1 is an isometric view of the apparatus of a portion of the invention showing the preferred embodiment of an adjustable retaining means.

FIG. 2 is an end view of the cuff of FIG. 1 showing the relationships between the inflatable bag, the transducer and the rigid outer wall of the cuff.

FIG. 3 is a block diagram of the apparatus of the complete system including the means for calibrating and testing the system.

FIG. 4 is a plan view with parts removed of the calibrating mechanism of the invention.

FIG. 5 is an end view of a second embodiment of the cuff-transducer convention in position in relation to the limb of a subject.

FIG. 6 is an enlarged view of the tightening bracket of the cuff-transducer convention of FIG. 5.

Referring now to FIG. 1, there is shown a preferred embodiment of a cuff 10 as a part of this invention which makes possible precise calibration of the cuff pressure in the pneumatic system and, in addition, exhibits the advantage of rigidity over conventional cuff means to provide a reference for portions of the overall technique. The cuff 10 comprises a band 12 of semi-rigid material, for which nylon has been found to be one practical expedient, rolled into a circular shape and cured to retain this general circular configuration. A second band 14 of this nylon material in an arcuate configuration is interleaved between the ends of the first band 12 and overlaps a portion of the first band. Each of the bands 12, 14 is formed of nylon approximately .040 inch thick and approximately 4 inches wide and of a length suitable to form a circular sleeve or retaining means 15 for convenient placement about the limb of a subject, the sleeve being about 5–6 inches in diameter. Located in one end of the first band 12 are two series of holes 16 in two rows 18, 20 extending in an arc over a portion of the circumference of the band 12 and which provide a convenient means for performing the gross adjustment of the cuff 10. A pair of dogs 22 are attached by bolts 23 to one end of the second band 14 and depend from the second band for cooperation with the holes 16 of the first band 12. The fine adjustment of the retaining means 15 is provided by a pair of metallic straps 25, 26 attached respectively to the first and second bands 12, 14 and adapted to overlie one another. The strap 25 contains a series of slots 27 which cooperate with a thumb screw 28 rotatably retained on strap 26 so that the straps 25, 26 and thus the bands 12, 14 may be drawn into overlapping relation with one another upon turning of the thumb screw 28. A handle 30 is mounted at one end of the second band for convenience in opening the retaining means 15 and for engaging the dogs 22 in the holes 16 during the gross adjustment when placing the cuff 10 about the limb of a subject.

Located within the bands 12, 14 and extending over a great portion of the inner periphery of the bands is an inflatable bag 32 which may be the same type of bag used for conventional sphygmomanometer measurements. The bag 32 is held in place with respect to the first band 12 by rivets 33 or bolts passing through the first band 12 and through the fabric at each closed end of the inflatable bag 32. A transducer 34 and a focusing disc 35 are located between the bag 32 and the inner surface of the first band 12 and may be retained in place solely by the frictional contact therein or by any other convenient means. The operation of such transducer 34 and focusing disc 35 in providing an electrical analog of cardiovascular variations is brought out in greater detail in the U.S. Patent application Ser. No. 338,240, of M. A. Buffington, now Pat. No. 3,315,662.

An air pressure gauge 38 is connected by rubber tubing 40 to the inflatable bag 32 to form a portion of the pneumatic system of the invention. The pneumatic connections are completely airtight so that a fixed volume of air may be retained within the pneumatic system for purposes which will be brought out in greater detail hereafter. A calibrating means 42 is shown attached to the inflatable bag 32 by rubber tubing 44 and when so connected is a part of the pneumatic system of the invention.

Referring now to FIG. 3, showing the connections of the system, the following description will give the overall method of operation for recording vascular variations. Assuming that a fixed and measured amount of air is entrapped within the pneumatic system, the nylon bands 12, 14 may be opened by removing the dogs 22 on the second band 14 from the holes 16 of the first band 12 so that the entire cuff 10 may be placed about the limb of a subject. Gross adjustment of the cuff 10 is made by placing the dogs 22 into an appropriate pair of holes 16 to snugly wrap the cuff 10 about the limb of the subject. This may or may not provide an indication on the gauge 38 and it is only necessary to have the cuff sufficiently loose so that a desired amount of pressure has not been caused to occur within the pneumatic system. Fine adjustment is made by turning the thumb screw 28 causing the nylon bands 12, 14 to more completely overlap one another and causing the cuff 10 to be constricted about the limb of the subject. Such adjustment thereby compresses the inflatable bag 32 against the limb of the subject and, in turn, compresses the air within the pneumatic system and such adjustment is continued until the desired air pressure reading is attained on the gauge 38. A gauge indication of 40 mm. of mercury has been found to be an optimum pressure for the system and it is to be noted that such pressure is considerably less than the pressures encountered in the conventional sphygmomanometric measurement technique. The establishment of such a pressure within the cuff 10 is not intended to constrict blood vessels or restrict blood flow but is primarily desired as a means for establishing a convention which is highly repeatable and may be utilized with different and varied subjects. The inflatable bag 32 and the volume of air entrapped therein also provide an effective medium for transmitting pulses which occur from variations in blood flow within the limb to the transducer 34 to provide electrical signals for energizing the recording means 46, which includes a gain control 47. In effect, then, the cuff-transducer assembly has provided a means for providing an electrical analog of blood flow variations within the limb of the subject. It is to be noted also that the rigid enclosure provided by the nylon bands 12, 14 about the inflatable bag 32 provides a frame of reference within which the pulses from the system act to thereby compress the only resilient means within the system, this being the inflatable bag member 32, to cause a transmission of the pulses therethrough. Thus, although the transducer 34 is somewhat localized with respect to the circumference of the band 12, the transmitting medium of the air trapped within the bag 32 insures that pulses emanating from the periphery of the limb of the subject will be effectively transmitted to the transducer 34.

The signals generated by the transducer 34 are then transmitted along a wire 48 to the recording device 46 which may be a modified electrocardiograph for providing a recording of the pulse waveshape or the signals may be transmitted to a monitor such as an oscilloscope for providing a temporary visualization of the variations. Such apparatus then is useful for recording the following parameters used in the diagnosis and treatment of the cardiovascular system of a subject: pulse contour and amplitude, cardiac rate and rhythm and the phase relationship of pulses in various limbs when a plurality of this type of cuff convention is utilized.

In order that this system may be useful and provide meaningful information, however, it is necessary that it be calibrated so that measurement may have a high degree of repeatability and compatibility between various subjects. For this reason, calibrating means 42 are provided to be used in conjunction with this system. Referring now to FIG. 4, there is shown the mechanism of the calibrating means 42 for injecting a fixed quantity of air into the pneumatic system to provide a standard pulse for testing the reliability of the system and for calibrating the instruments used therein. The interior chamber of an expandable bellows 50 is connected into the pneumatic system by means of rubber tubing 44 attached to the outlet 52 of the bellows 50. Upon contraction of the bellows from a predetermined extension, a standard volume of air may be injected into the pneumatic system. A rod 54 soldered or welded to the closed end of the bellows 50 is connected to a lever 56 fixedly mounted on a drive gear 58, which in turn is rotated through a fixed angle to provide the desired extension of the bellows 50. The mechanism for rotating the drive gear 58 and for latching it into position prior to triggering of the calibration pulse consists of a camming lever 60, pivotally mounted on pin 61 on the housing and which is manually depressed by extension rod 62 to abut lever 56 causing rotation of the drive gear 58 and an extension of the bellows 50. Simultaneously, latching lever 64, pivoted on pin 65 mounted on the housing and biased by spring 66, will rotate clockwise so that extension member 68 will latch camming lever 60 in abutment with lever 56. Rotation of the drive gear 58 also causes rotation of meshing pinion gear 70 providing a dial indication by pointer 72.

When the member 68 is released through the counterclockwise rotation of latching lever 64 by manually depressing extension 74, camming lever 60 will be free to rotate and the drive gear 58 and lever 56 will be returned to their initial positions under the influence of the bias of the bellows 50. The initial position of the drive gear 58 may be adjusted by varying the extension of the zero set screw 76 which abuts lever 56. In this manner an accurate and highly repeatable quantity of air may be pulsed into the pneumatic system, since the bellows 50 is always extended a fixed distance, while the initial position may be varied by the zero set screw 76.

Use of and experimentation with this technique has made it clear that it is often necessary to utilize calibration means in conjunction with this invention to assure that the parameters previously listed can be held as accurate and, therefore, worthwhile as possible. Referring again to FIG. 3, there is shown a plastic calibrating tube 78 which is an imitation limb and is utilized as a means for establishing standards for this system.

The tube 78 consists of a sleeve of plastic material roughly the diameter of a limb of an average subject and of a length sufficient so that the cuff 10 may be placed thereon. When the cuff is placed on this plastic tube 78, the same technique is employed in constricting the cuff over the tube to attain the desired air pressure in the pneumatic system. Then, in actuating the calibrating means 42, an accurate amount of air is pulsed into the pneumatic system to induce a pulse in a fashion similar to that of a pulse acting in an actual limb. Since the quantity of air injected into the system is uniform and all other parameters of the technique remain constant, the gain control 47 of the recording instrument 46 may be adjusted to provide a calibrated amplitude of pulse for future measurements with the cuff 10 on an actual limb. Simultaneously, this provides a fool-proof way of testing all parts of the system since any leaks of air, or impairment of the transducer 34 and its connections or of the recording instrument 46 will be revealed. Slight variations of the components of the system, such as those due to aging or to temperature effects, similarly may be compensated during this calibrating procedure.

The quantity of air injected by the calibrating means 42, as pointed out previously, is adjustable and may be set so as to provide the equivalent signal from the transducer 34 which would be obtained from a normal pulse. Once adjustment of the calibrating means 42 has been made, the amount of air injected will be very precisely repeatable due to the fact that the bellows 50 are made of metallic material and are expanded between precisely located initial and latched positions.

Referring now to FIGS. 5 and 6, there is shown a second embodiment of an adjustable cuff 80 which may be substituted for the rigid cuff shown in FIGS. 1 and 2. This cuff finds application in certain procedures because it is somewhat simplified and provides a somewhat less cumbersome form of apparatus. Concurrently, there is also some lack of security in using this second embodiment of the cuff, with a resultant impairment of accuracy of measurement; however, for all practical purposes either cuff may be utilized in this system depending on the degree of accuracy demanded.

The cuff 80 consists of a length of fabric material 82 similar to the standard sphygmomanometer cuff which is wrapped around a limb 83 of a subject. An inflatable bag member 84 is disposed in a pocket 85 of the cuff 80 formed by a piece of fabric 86 stitched to the fabric 82 and is adapted to be placed adjacent the limb 83 of the subject and surround the limb 83 for a substantial part of its circumference. A transducer 87 similar to that of the first embodiment is located also in the pocket 85 of the cuff between the outer portion of the pocket 85 and the inflatable bag 84 and is adapted to receive pulses transmitted from the limb 83 into the inflatable bag 84. One end of the fabric material 82 is passed through a bracket 88 and is secured to other portions of the fabric cuff as at 89 by means of Velcro material or by conventional clamp means. Thus, it may be seen that in the performance of the measurement technique the gross adjustment is again made by wrapping the cuff 80 around the limb 83 of the subject and securing it by means of the Velcro or clamps at 89 so that the air pressure indication of the pneumatic system is near the desired value.

The fine adjustment is then made by varying the bracket means 88 to increase or decrease the tension in the cuff. It is understood, of course, that the pneumatic system of this embodiment is identical to that shown in the first embodiment wherein an air pressure gauge and a calibrating mechanism may be connected to the inflatable bag as indicated at location 90.

The bracket, as shown in an enlarged view in FIG. 6, resembles a bicycle pedal and comprises a pair of end plates 91 maintained in spaced relation by a pair of rods 92 fixedly attached to the end plates 91. A lower centerpiece 93 is also fixedly attached to the end plates 91 and extends therebetween. An upper centerpiece 94 of arcuate configuration and of a length that is less than the spacing between the end plates 91 is located above the lower centerpiece 93 and is retained in position by a thumb screw 95 threaded through the upper centerpiece 94 and rotatably mounted on the lower centerpiece 93 in a bearing block 96. Thus, as the thumb screw 95 is turned the upper centerpiece 94 will be moved upwardly or downwardly. In use, the fabric material 82 of the cuff is threaded between the rods 92 and over the upper centerpiece 94 to overlie the upper centerpiece 94 so that a greater or lesser length of the fabric will be drawn into the tightening bracket 88 when the thumb screw 95 is rotated. It is usual also that the fabric material 82 have a slot located therein so that the tightening screw 95 may be passed therethrough to allow some movement of the material 82 relative to the bracket 88.

As has been pointed out previously, the fabric type cuff 80 allows some resilence in the system and a consequent reduction in accuracy. However, for all practical purposes, the use of this cuff will provide measurements similar to that provided by the cuff of the first embodiment and in addition provide a more convenient and portable apparatus.

Although particular sizes for the cuff means and particular air pressure indications have been provided in this specification as the optimum conditions of use, the teachings of this invention are not to be construed as so limited. Thus it is possible that different sizes of cuffs may be employed utilizing the same principles of this invention both in smaller techniques wherein measurements might be performed upon a digit of a subject and in larger techniques where the teachings of this invention are just as applicable. Similarly, the air pressure designated in this description is considered to be an optimum value but is subject to some variation. Limitations on this value include having sufficient pressure to establish a workable pulse-transmitting convention, while not being so great as to constrict blood vessels in the particular limb of the subject.

I therefore particularly point out and distinctly claim as my invention:

1. A system for quantitatively monitoring cardiovascular variations in the limb of a subject comprising the steps of placing a constrictable cuff, containing a bag having a fixed volume of air and an electrical pressure transducer, about the limb of a subject, constricting the cuff until a predetermined pressure value is attained by the fixed volume of air, such pressure value being lower than that value to completely restrict the flow of blood in the limb, withdrawing and then injecting a fixed quantity of air into the bag via a closed pneumatic system to pulse the transducer and create a standard electrical indication, applying the electrical indication to a visual display device, and adjusting the gain control of such display device to achieve a predetermined display amplitude for the standard indication, the display device thereafter providing calibrated indications of the cardiovascular variations.

2. A system for monitoring cardiovascular variations of a subject comprising resilient bag means containing a fixed quantity of an impulse-transmitting fluid, cuff means for constraining said bag means about a portion of the subject, said cuff means being adustable to compress said bag means against the subject to develop a predetermined pressure of the fluid, transducer means contiguous with said bag means and said cuff means for converting pulsations emanating from the subject and acting upon said bag means into electrical signals, indicator means connected to said transducer means for providing a visual indication of such pulsations, and calibration means connected to said bag means for withdrawing and injecting a quantity of fluid in said bag means to produce a standard impulse to said indicator means.

3. A system as set forth in claim 2 further including gain control means connected to said indicator means for varying the response of said indicator means to such standard impulse.

4. A system as set forth in claim 3 wherein said calibration means comprises a bellows and bellows actuating mechanism, said bellows being connected to said bag means by a fluid tight connection to transfer fluid therebetween, said actuating mechanism being adapted to actuate said bellows a predetermined amount thereby to inject a specific quantity of fluid into said bag means as a standard impulse.

References Cited

UNITED STATES PATENTS

| | | | |
|---|---|---|---|
| 1,788,434 | 1/1931 | Keeler | 128—2.05 |
| 2,139,509 | 12/1938 | Marcellus | 128—2.05 |
| 2,405,265 | 8/1946 | McAlpine | 24—170 |
| 2,560,237 | 7/1951 | Miller | 128—2.05 |
| 2,714,379 | 8/1955 | Raines | 128—2.05 |
| 2,989,051 | 6/1961 | Zuidema et al. | 128—2.05 |
| 3,032,030 | 5/1962 | Han | 128—2.05 |
| 3,095,873 | 7/1963 | Edmunds | 128—2.05 |

FOREIGN PATENTS 203,545    10/1939    Switzerland.

DELBERT B. LOWE, Primary Examiner